United States Patent Office 2,861,658
Patented Nov. 25, 1958

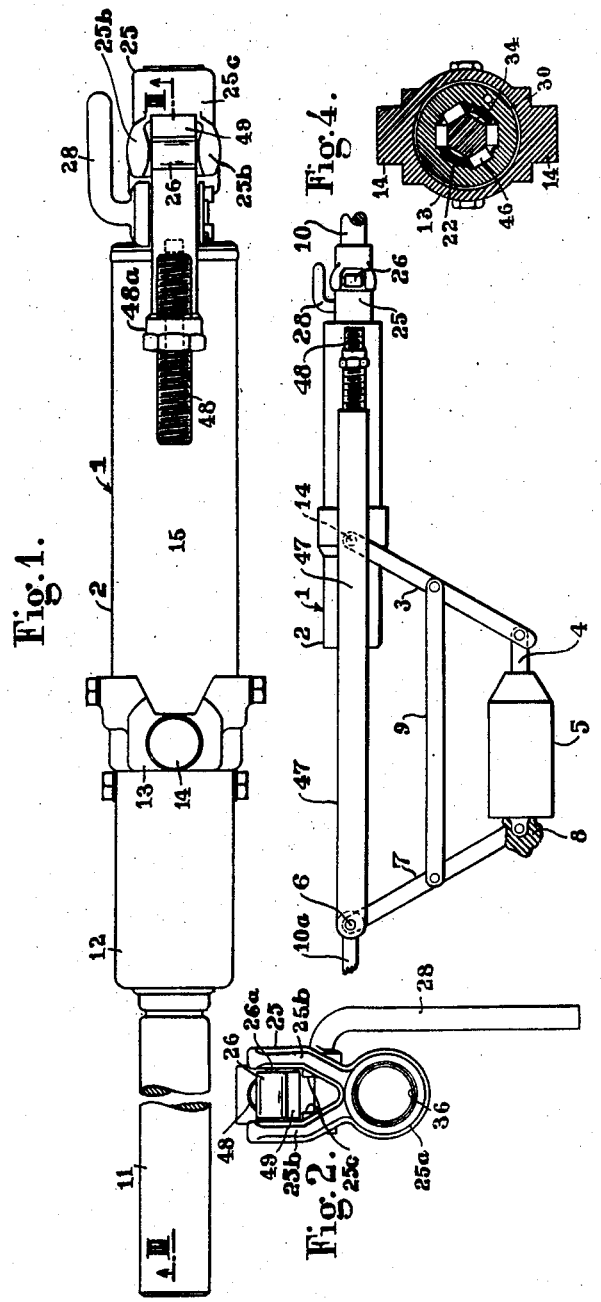

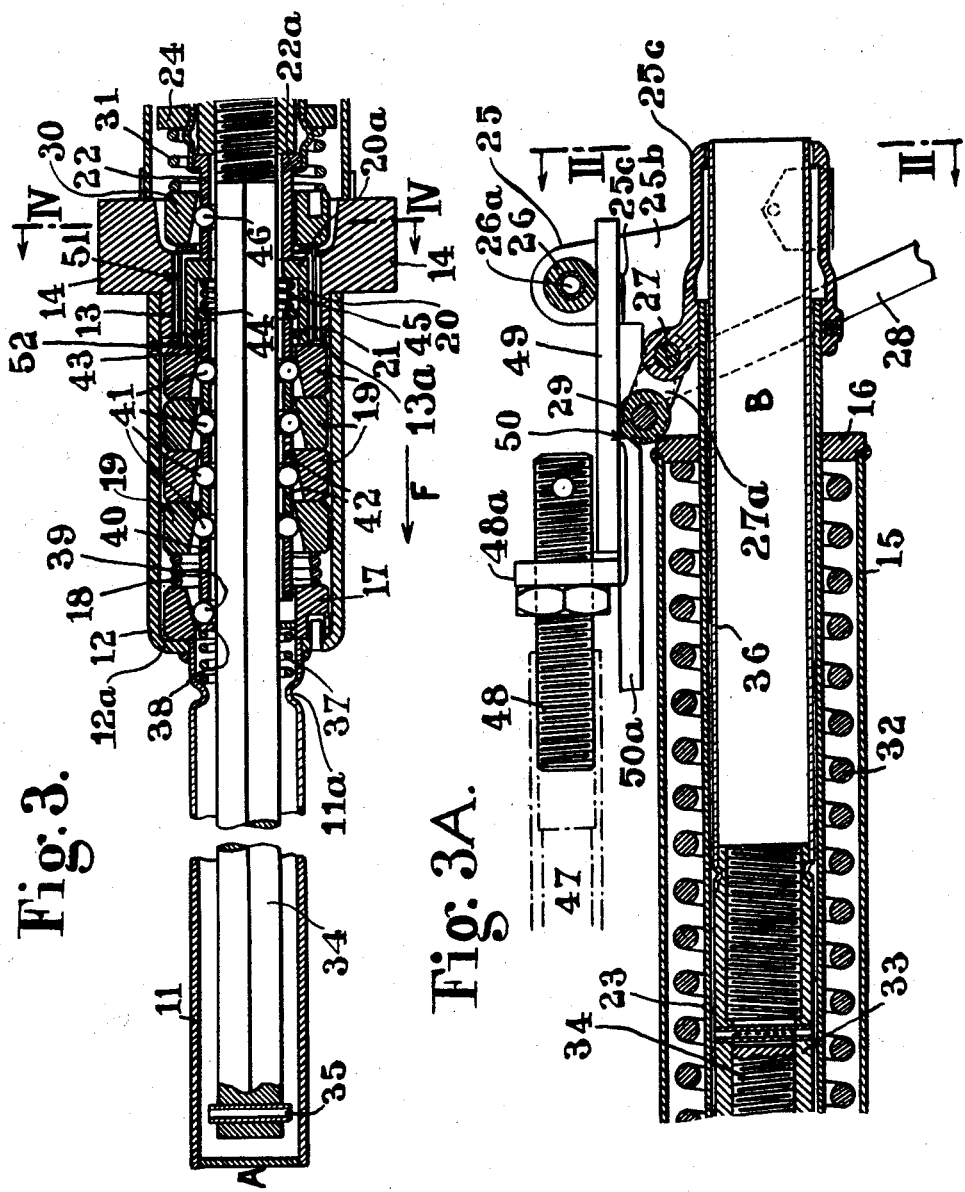

2,861,658

ADJUSTER WHICH AUTOMATICALLY LETS OUT AND TAKES UP SLACK IN RAILWAY BRAKE RIGGING

Jean Bouvat-Martin, Paris, France, assignor, by mesne assignments, to Westinghouse Air Brake Company, Wilmerding, Pa., a corporation of Pennsylvania Application June 7, 1954, Serial No. 434,946

Claims priority, application France June 11, 1953

9 Claims. (Cl. 188—196)

This invention relates to an adjuster which is capable of elongating and contracting for respectively increasing and decreasing the distance between two interconnected members, and more particularly relates to a slack adjuster which is capable of elongating and contracting for respectively letting out and taking up slack in the brake rigging of a railway car.

In U. S. Patent 2,714,027, granted on July 26, 1955, to applicant, there is shown and described a slack adjuster of the above type comprising a telescopingly arranged body and prismatic rod, and a strong helical return spring which is interposed between an enveloping casing and the body for biasing said body to a normal or rest position when no pulling force is exerted on the casing. When the body is in this position, it operatively causes a series of stop rollers and retaining rollers to be wedged against flat longitudinal faces of the prismatic rod to prevent contraction or elongation of the adjuster against pushing forces and also against pulling forces of less than a preselected value as determined by the value of the return spring. When, during a brake application, the body is offset a certain distance relative to the rod, the body operatively causes the retaining rollers to become unlocked, thereby enabling the adjuster to be lengthened under the action of a pulling force exceeding said preselected value exerted on the casing. When, during the brake application, the body is offset more than a certain greater distance relative to the rod, the retaining rollers will be locked and the stop rollers unlocked, with the result that when the brakes are released, the return spring will cause the body to operatively wedge take-up rollers against the prismatic rod and thereby cause said rod to be pushed inwardly with and by the body relative to the casing for shortening the adjuster.

While this previously proposed adjuster operates satisfactorily under most conditions, certain difficulties have been experienced which will now be described. If a shock applied to the rod and tending to lengthen the adjuster is not of sufficient power to overcome the force of the return spring or if it is so powerful as to cause the casing to wedge the retaining rollers against the prismatic rod in by-pass of the body, the adjuster desirably remains locked against lengthening; however, if the shock has an "intermediate power" which is sufficient to slightly compress the return spring, the retaining rollers can become unlocked and the prismatic rod can then be pulled outwardly relative to the body and cause an undesirable and unintended lengthening of the adjuster, and thereby undesirably let out (increase) slack in the brake rigging. Also, the longitudinal distance between the points of attachment of the casing and of connection of the prismatic rod to a lever and a traction bar, respectively, were so widely separated that it was difficult, if not impossible, to install the adjuster on railway cars having limited installation space. Also, the respective components were relatively heavy in weight to withstand the high stresses in the previously proposed arrangement and consequently the adjuser was relatively expensive.

It is therefore the principal object of this invention to provide an improved adjuster of the above general type which overcomes the aforementioned difficulties.

According to this object, an improved adjuster is provided embodying novel means, preferably in the form of a tubular push element, for positively preventing unwedging of the retaining rollers when the shock tending to lengthen the adjuster is of the above-described "intermediate power," as well as when it is of greater power. Also, the improved adjuster is considerably lighter in weight, and less expensive than the adjuster heretofore proposed. Also, the improved adjuster has a very small distance (of about one centimeter) between the points of attachment of the casing to the lever and of connection of the prismatic rod to the traction bar, when the adjuster is of minimum length.

Another object is to provide an improved adjuster embodying novel means for permitting the return spring to be manually caged to facilitate removal of components from the adjuster and also permitting manual elongation of the adjuster for increasing slack to change the brake shoes; said means also being operable to automatically cage the return spring during a brake application.

Other objects and advantages will become apparent from the following more detailed description of the invention and from the accompanying drawings, wherein:

Fig. 1 is a plan view to reduced scale of the adjuster in a normal or rest position, and with its overall length at a minimum;

Fig. 2 is an end view to reduced scale taken along the line II—II of Figs. 3—3A.

Figs. 3 and 3A, when taken together such that the right-hand edge of Fig. 3 is matched with the left-hand edge of Fig. 3A, constitutes a longitudinal sectional view of the adjuster taken along the line III—III of Fig. 1.

Fig. 4 is a cross-sectional view to reduced scale taken along the line IV—IV of Figs. 3—3A, and Fig. 5 is a diagrammatic view showing the manner in which the adjuster (as viewed in Fig. 1) is associated with other components of a brake rigging for a railway car.

Description

As shown in Fig. 5, an adjuster 1 embodying the invention comprises a hollow sectionalized casing 2 having oppositely arranged trunnions 14 by which the casing is carried on, and at one end of, a straight lever 3. At its opposite end, lever 3 is pivotally connected to a piston rod 4 of a brake cylinder 5. A straight control rod 47 is pivotally connected by a pin 6 to one end of a straight lever 7, the other end of which is fulcrummed on a pin carried by a fixed member 8 on which the brake cylinder 5 may also be supported. A link 9 pivotally connected to the levers 3 and 7 cooperatively connects these levers. A traction bar 10, which is connected to a prismatic rod 34 (Fig. 3) within the casing 2, projects exteriorly of the casing and is operatively connected to the brake shoes (not shown) of one pair of wheels in the conventional manner. Another traction bar 10a is pivotally connected by the pin 6 to the lever 7 and is operatively connected to the brake shoes (not shown) of the other pair of wheels in the conventional manner.

Referring now to Figs. 3 and 3A, the casing 2 comprises a relatively thin-walled protection tube 11 closed at one end and at its opposite end welded or otherwise secured to an inwardly directed radial flange 12a provided at one end of a larger diameter annular member 12. At its opposite end the member 12 is secured to an attachment ring which comprises a lip 13 that projects concentrically into the member 12 so as to provide an annular shoulder 13a and also comprises the trunnions 14. To the opposite side of the attachment ring from the lip 13 is attached a thin-walled spring-enclosing tube 15 that has a central bore through an end wall 16. The various components 11, 12, 13, 15 of the casing 2 are coaxially arranged and movable as a single rigid unit.

Within the member 12 is a helical spacer spring 18 that biases a centrally apertured stop cup 17 in the direction of tube 11 and into contact with the inner side of flange 12a and biases a plurality of (such as four) laterally abutting central apertured retaining cups 19 in the opposite direction into contact with one side of an outwardly directed radial flange 52 on a tubular push element 51 for, in turn, causing the opposite side of said flange 52 to engage the shoulder 13a. These cups 17, 19 and spring 18 and element 51 are disposed concentrically about the prismatic rod 34. The central apertures of the stop cup 17 and of the respective retaining cups 19 are defined, in part, by flat wedging surfaces which are so inclined that these apertures are largest at their ends nearest the spring 18, which spring spaces cup 17 from the cups 19.

A series of rollers 39 are arranged in a crown or ring about the rod 34, such that each of said rollers is adapted to be wedged between one flat inclined wedging surface of cup 17 and a corresponding flat non-inclined face of the prismatic rod 34. Similarly, each of the retaining cups 19 has a series of rollers 41 which are arranged in a crown or ring about the rod 34, such that each of said rollers is adapted to be wedged between one flat inclined wedging surface of a respective cup 19 and a flat non-inclined face of the prismatic rod 34.

A helical bias spring 37, which is backed up against an inwardly directed ridge 11a of tube 11, acts in the direction of end wall 16 through the medium of a washer 38, rollers 39, a spacer sleeve 40, rollers 41 of the adjacent retaining cups 19, spacer sleeves 42 between the rollers 41 of the remaining cups 19, the rollers 41 of the outermost retaining cup 19, a spacer sleeve 43, and a washer 44, against a helical stop spring 45 which is backed up against an inwardly directed flange 20a provided at the end of a sleeve 20 which is nearest end wall 16; the washers 38, 44 and sleeves 40, 42, 43 being hereinafter referred to as a "roller cage" since they will be shifted axially as a single unit. The unflanged portion of sleeve 20 extends into an annular space surrounding the spring 45 and defined within the bore of tubular element 51; the unflanged end of sleeve 20 being capable of abuttingly engaging the outermost retaining cup 19.

The flanged end of sleeve 20, at its side opposite spring 45, normally abuts an unflanged end of a sleeve-like cage 22 which carries a series of take-up rollers 46 that are arranged in a crown or ring about the prismatic rod 34. Each of these rollers 46 is adapted to be wedged between a flat non-inclined face of said rod and a corresponding flat inclined wedging surface of a centrally apertured take-up cup 30; these respective wedging surfaces being inclined in the same direction as those of the retaining cups 19. The cage 22 has an outwardly directed flange 22a about which is welded or otherwise secured a sleeve 23 that projects through and exteriorly of the central bore of end wall 16.

A control head 25 has a tubular portion 25a that surrounds, and is suitably secured to, the outermost projecting part of sleeve 23. The head 25 also has a pair of spaced lugs 25b (Fig. 2) which are joined to the tubular portion 25a and carry two transverse pins 26a and 27. Pin 26a carries a roller 26 and takes the upward thrust exerted on a flat guide member 49 that is disposed below and engages the roller 26 and is slidable on channels 25c formed integrally with the head 25. This member 49 is rigidly connected to another substantially flat member 50a and both members are carried through the medium of a supporting unit 48a on a manually adjustable screw 48 that is axially adjustable relative to, and carried within a threaded bore of, the control rod 47. Pin 27 is disposed between pin 26a and the tubular portion 25a and is nearer the end wall 16 than pin 26a. A link 27a is pivotally carried at one end by pin 27 and at the opposite end carries a roller 29 that normally rests against the guide member 49 but is deflectable by a cam 50 that is formed at the outermost end of member 50a and is inclined in generally the same direction as the inclined wedging surfaces of stop cup 17.

An internally threaded coupling sleeve 33, slidably disposed within the sleeve 23, establishes screw-threaded connection between the end of rod 34 nearest the head 25 and the inner end of the traction bar 10 (see Fig. 5), which traction bar projects exteriorly of the tubular portion 25a of said head. Preferably coaxially crimped or otherwise secured to the sleeve 33 is an indicator sleeve 36, which projects exteriorly of the end wall 16. When the adjuster is of minimum length, as shown in Figs. 3–3A, the coupling sleeve 33 will abut the flange 22a of cage 22, and the projecting end of indicator sleeve 36 will be flush with the outer end of the tubular portion 25a of the head 25. As the adjuster is lengthened, the indicator sleeve 36 will project beyond the tubular portion 25a an extent corresponding exactly to the degree of lengthening of the adjuster, as will be understood from subsequent description.

Operation

Assume initially that no leftward pulling force is exerted on the trunnions 14 by lever 3 and that the adjuster is of minimum length, as just defined. Under this condition, a strong helical return spring 32, which is interposed between the end wall 16 and a slide ring 24 that bears against a ridge around sleeve 23, will act on ring 24 for biasing the control head 25, sleeve 23, and cage 22 (which rigidly connected members 25, 23, 22 will hereinafter be referred to as the "body") leftward, such that cage 22 abuts flange 20a of sleeve 20 and causes the opposite end of sleeve 20 to abut the outermost of the retaining cups 19 for thereby forcing said cups 19 leftward; this, in turn, will cause spacer spring 18 to be fully compressed and force stop cup 17 into contact with flange 12a. Also, with sleeve 20 thus positioned, stop spring 45 will shift the roller cage 44, 43, 42, 40, 38 leftward against resistance of spring 37, which is weaker than spring 45. Thus, the stop rollers 39 will be wedged against the stop cup 17 by the predominant action of spring 45 on the roller cage; and, with the position of the roller cage thus fixed by the wedging of rollers 39, the retaining cups 19 will be wedged against the retaining rollers 41 by the thrust operatively exerted by the return spring 32 through the medium of the body 25, 23, 22 and sleeve 20, with the result that the rod 34 will be locked against both leftward and rightward movement.

Under the assumed condition, therefore, the adjuster 1 will be in a normal or rest position, in which all of the components will be in the respective positions in which they are shown in the drawings. It is to be noted that, according to a feature of the invention, the sum of the axial widths of the stop cup 17, retaining cups 19, flange 52 of push element 51, and of the spacer spring 18 when fully compressed, is so selected as to be about 1.5 millimeters less than the distance between the flange 12a and shoulder 13a; and hence under the assumed condition, there will be a clearance of the aforementioned 1.5 millimeters between the flange 52 of push element 51 and the shoulder 13a. Also, according to another feature of the invention, the push element 51 is of such axial length that the end of said element opposite the flange 52 normally bears on the take-up cup 30 for biasing the latter rightward about 1.5 millimeters against the resistance of a helical take-up spring 31 that encircles the body 22, 23 and is interposed between cup 30 and the ring 24; and hence the push element 51 by opposing the action of spring 31 assures that the take-up rollers 46 will not be wedged against the rod 34.

The adjuster 1 will tend to be lengthened by a shock force acting rightward on traction bar 10, and hence on the rod 34, and tending to compress the return spring 32 through the medium of the rollers 41, retaining cups 19, sleeve 20, and the body 22, 23, 24, 25. If the force of such shock does not exceed the wedging force operatively exerted by spring 32, the rollers 41 will, of course, be maintained wedged by the pressure of said spring for thereby preventing lengthening of the adjuster. According to a feature of the invention, however, if the force of such shock exceeds the wedging force operatively exerted by spring 32 and tends to compress the latter, then the force exerted by the take-up spring 31 on the retaining cups 19 through the medium of the take-up cup 30 and push element 51, will maintain the cups 19 wedged against the rollers 41 and prevent rightward movement of bar 34; it being noted that the spring 31 is of greater force than the net force exerted by the springs 45, 18 and 37, and that with the adjuster in its rest position, in which it is shown, the rollers 46 are not wedged between the take-up cup 30 and bar 34.

By way of contrast, with arrangements heretofore proposed the wedging of the retaining rollers is accomplished solely by the return spring acting through the body on the retaining cups. In other words, there is no force (such as imposed by the present spring 31 through the cup 30 and push element 51) acting on the retaining cups to supplement the force of the return spring and insure that the retaining rollers will be maintained wedged even if a shock applied to the traction bar tends to compress the return spring.

Hence, with these previously proposed arrangements, if the force of a shock on the traction bar tending to pull out the prismatic rod and thus lengthen the adjuster is sufficient to effect slight compression of the return spring and thereby remove its roller-wedging effect on the retaining cups, the stop spring will shift the roller cage leftward and thus unwedge the retaining rollers with the result that the prismatic bar can then slide rightward and cause an undesired lengthening of the adjuster and a consequent undesirable increase in slack.

Assume now that a brake application has been initiated by supply of fluid under pressure to the brake cylinder 5. As the brake cylinder piston rod 4 moves out, it will rock lever 3 and through the link 9 cause lever 7 to pivot about fixed member 8, with the result that the pin 6 and trunnions 14 will be moved toward each other, for thereby respectively pulling the traction bars 10a and 10 toward each other so as to operatively draw the corresponding brake shoes (not shown) into frictional braking contact with the respective wheels. Hence, control rod 47 will be moved rightward by pin 6, being guided in such movement by the flat guide member 49 which slides between channels 25c and roller 26; and a leftward force will be exerted by trunnions 14 on the casing.

During the initial stage of rightward movement of control rod 47 and hence of member 50a rigidly connected thereto, the cam 50 on member 50a will engage roller 29 and deflect the latter part way downward against the end wall 16 of casing 2, thereby forcing the control head 25 and hence the body 25, 23, 22 rightward a certain distance such as 1.5 millimeters against resistance of spring 32. This initial rightward displacement of the body will cause the cage 22 thereof to shift the take-up rollers 46 rightwards the same distance and into light, non-wedging contact with the take-up cup 30. It is to be noted that the take-up spring 31 will still be effective to act through the take-up cup 30 and push element 51 on the rightmost retaining cup 19 for wedging the cups 19 against rollers 41; and spring 45 will, despite the corresponding 1.5 millimeter increase in the distance between flange 20a and washer 44, still be effective to bias the roller cage 44, 43, 42, 40, 38 leftward against resistance of spring 37. Thus, at the conclusion of the initial stage of rightward movement of the control rod 47, the adjuster will be locked by wedging of the stop rollers 39 and retaining rollers 41, and the take-up rollers 46 will have been shifted rightward 1.5 millimeters into light, non-wedging engagement with the take-up cup 30; also the return spring 32 will, in effect, be caged between ring 24 and roller 29. Thus, during this stage, the rigidly locked adjuster 1 will transmit braking effort from the brake cylinder piston rod 4 and lever 3 to the traction bar 10 and through link 9, lever 7 and pin 6 to traction bar 10a for pulling the bars 10 and 10a toward each other for thus operatively moving the brake shoes a preselected distance toward the wheels to be braked.

This initial stage of rightward movement of the control rod 47 is merely a preparatory stage and is followed by a second stage, now to be described, during which the rod 47 continues to move rightward.

As the control rod 47 continues to move rightward, the cam 50 will deflect roller 29 further downward against the end wall 16, but roller 29 will still be offset a greater distance from the body sleeve 23 than roller 26. This will cause the control head 25 and hence the entire body 25, 23, 22 to be moved an additional distance of such as 1.5 millimeters to the right against resistance of spring 32; and said body, through the medium of the take-up rollers 46 (which will then be wedged against take-up cup 30), will move the cup 30 rightward the same distance.

As the cup 30 is thus shifted rightward, the thrust exerted by spring 31 via said cup and push element 51 on the rightmost retaining cup 19 will be relieved; and hence spring 18 can now push the retaining cups 19 rightward until flange 52 of element 51 engages shoulder 13a. It is to be noted that spring 45 will continue to wedge the roller cage 44, 43, 42, 40, 38 leftward against the resistance of spring 37, and thus maintain the retaining rollers 41 in a fixed position defined by contact of stop rollers 39 with the stop cup 17. Hence the retaining cups 19 will be moved rightward relative to the stationary retaining rollers 41; and, since the body 22, 23, 25 is pulling rollers 46 rightward for correspondingly pulling the cup 30 rightward against resistance of spring 31, the rollers 46 will not lock the rod 34 against rightward movement.

With the rollers 41 thus unlocked, the prismatic rod 34 can be "pulled outward" relative to the casing 2; such "pulling out" of rod 34 will occur, however, only if slack is insufficient and causes the brake shoes to contact the wheel before the completion of the second stage, because then bar 10 and hence rod 34 will be held in contact with the brake shoes and permit the leftward force exerted via the trunnions 14 on the casing to pull the casing leftward relative to the stationary rod 34. The adjuster 1 will thus be elongated, with the result that upon the next brake application the traction bar 10 will have to move farther to engage the brake shoes. A stop pin 35 which extends transversely through the prismatic rod 34 is adapted to engage the ridge 11a for limiting the extent of rightward movement of said rod and hence the extent of elongation of the adjuster 1. Elongation of the adjuster 1 can and will continue until the control rod screw 48 engages the roller 26, for reasons hereinafter to be explained.

Thus, upon the completion of the second stage, the rod 34 will have been pulled rightward relative to the casing only if, and to the extent that, slack between the brake shoes and wheels is excessive. This stage will terminate when screw 48, by coming into contact with the roller 26, initiates the third stage.

During the third and final stage, the control rod 47 will continue its rightward movement against resistance of return spring 32 and, through the contact of the screw 48 with roller 26, shift the body 25, 23, 22 rightward an additional distance, such as 1.5 milliliters, making a total displacement of 4.5 millimeters since the control rod 47 left its rest or normal position in which it is shown in Figs. 3–3A and 5. As the body 25, 23, 22 is thus shifted rightward, the rollers 46 will carry the take-up cup 30 rightward the same distance, and hence out of contact with push element 51; spring 45 will bias sleeve 20 rightward the same distance and cause a retaining ring 21, which is carried in the unflanged part of sleeve 20 and is spaced about 3 millimeters from the left side of washer 44 and lightly contacts washer 44 at the completion of the second stage, to solidly bear against washer 44 and thus cage the spring 45 so that it no longer can offset the action of weaker spring 37; whereupon spring 37 will push the roller cage 38, 40, 42, 43, 44 rightward the same distance (as limited by contact with washer 44 which is acted upon by spring 45), relative to the stationary stop cup 17 and retaining cups 19.

It will be noted that spacer spring 18 will, as at the conclusion of the second stage, continue to maintain stop cup 17 in contact with flange 12a and also maintain the rightmost retaining cup 19 operatively in contact with the shoulder 13a (through the medium of flange 52 of element 51). Thus, this rightward movement of the roller cage, and hence of rollers 39 and 41, relative to the cups 17 and 19 will have the effect of unwedging the stop rollers 39 and wedging the retaining rollers 41 against rod 34.

With rollers 41 thus wedged and flange 52 solidly abutting the shoulder 13a and rightmost retaining cup 19, braking effort will be transmitted directly from the lever 3 (Fig. 5) to the traction bar 10 via the trunnions 14, lip 13, flange 52, retaining cups 19, rollers 41, prismatic bar 34, and coupling sleeve 33. Hence, any pulling out of the rod 34 rightward relative to the casing 11, 12, 13, 15 and body 25, 23, 22 will now be prevented by the wedged rollers 41; but due to the unwedging of rollers 39, the adjuster will be conditioned to subsequently, during a brake release, permit inward movement of the rod 34 to take up slack, as will now be explained.

The brake cylinder piston rod 4 will, of course, move outwardly to the extent necessary to bring the brake shoes into engagement with the respective wheels. If slack is exactly as desired, the brake shoes will engage the wheels at substantially the same instant that the rollers 41 become wedged against the rod 34. If, however, slack is excessive, the control rod 47 will continue to be moved rightward due to continued outward movement of the brake cylinder piston rod 4 and, in so doing, continue to shift body 25, 23, 22 rightward against resistance of the return spring 32 acting on the body through ring 24. This will cause take-up rollers 46 to pull the cup 30 rightward against resistance of spring 31. The sleeve 20 will not move rightward because spring 45 is caged by the retaining ring 21, and hence there will be no movement of the roller cage 44, 43, 42, 40, 38 or of the retaining cups 19 or stop cup 17; and consequently the retaining rollers 41 will continue to be wedged against the rod 34 and the stop rollers 39 will continue to be unwedged from rod 34. The cup 30 will thus be pulled rightward until the brake shoes engage the wheels and cause a cessation of the rightward movement of the control rod 47 and hence of the body 25, 23, 22. The extent by which the cage 22 of the body is shifted rightward relative to the stationary sleeve 20 will be indicative of the degree of excess slack.

Assume now that fluid under pressure is vented from the brake cylinder 5 to release the brake application. As the brake cylinder piston rod 4 moves into the brake cylinder, the lever 3 will rock and through link 9 cause lever 7 to pivot about fixed member 8, with the result that the pin 6 and trunnions 14 will be moved away from each other. Hence, control rod 47 will be moved leftward by pin 6, and a rightward force will be exerted via the trunnions 14 on the casing 2. The take-up rollers 46 will now be wedged by spring 31 against rod 34; and return spring 32, acting through ring 24 on the body, will provide the power to drive the wedged rollers 46 leftward and thereby push the rod 34 leftward; it being noted that spring 31 is backed up by ring 24 of the body and hence will effectively prevent unwedging of the rollers 46.

The prismatic bar 34 will be shifted leftward during the release of the brake application a distance equal to the distance which the take-up cup 30 was shifted rightward out of contact with the push element 51; in other words, the distance that the take-up rollers 46 were pulled rightward after the completion of the second stage. This will be true because as soon as the brake release is initiated, the take-up spring 31 will act on cup 30 to wedge rollers 46 against the bar 34 and cause it to be moved leftward under the power of the return spring 32.

Thus, if slack was not excessive, the rod 34 will be shifted the illustrative 1.5 millimeters until the take-up cup 30 engages the push element 51 and is thus held stationary and can no longer maintain rollers 46 wedged against the bar 34; and meanwhile, since slack was not excessive, cage 22 will not have been pulled away from sleeve 20, and hence as the cup 30 moved toward engagement with push element 51, the body 25, 23, 22 and hence the sleeve 20 will be moved a corresponding distance leftward, which will uncage stop spring 45, permitting it to thereupon drive the roller cage 44, 43, 42, 40, 38 leftward against the weaker spring 37 and thereby wedge the stop rollers 39 against the stop cup 17 and unwedge the retaining rollers 41 from the retaining cups 19; it being noted that the cups 17 and 19 will then be held stationary and spaced apart their maximum distance by spring 18.

If, however, slack was excessive, then the rod 34 will be shifted leftward, as above stated, a distance equal to the distance the take-up rollers 46 were pulled rightward following completion of the second stage of braking. Under this condition, the total distance the bar 34 is shifted leftward will be the distance cage 22 was shifted rightward away from sleeve 20 during the preceding brake application plus the aforementioned 1.5 millimeters following contact of cage 22 with sleeve 20.

It will thus be apparent that the adjuster will always be shortened at least 1.5 millimeters during the release of a brake application, and will be shortened more than 1.5 millimeters only if slack during the preceding brake application had been excessive. When this shortening of the adjuster has been completed, the respective components will be in the same respective positions as they assumed at the completion of the second stage.

As the brake cylinder piston rod 4 continues to move inward and thus push the pin 6 and trunnions 14 apart, the body 25, 23, 22 will continue to move leftward, causing take-up spring 31 through the medium of cup 30 and push element 51 to push the retaining cups 19 leftward relative to the now stationary roller cage and rollers 41 and 39, with the result that retaining rollers 41 will become wedged against the bar 34, and the stop rollers 31 and take-up rollers 46 will continue to be wedged against said bar. The parts will now be in the respective positions they assumed at the completion of the first stage.

Further leftward movement of the body 25, 23, 22 will now cause unwedging of the take-up rollers 46 because, with the cups 19 and hence push element 51 and cup 30 held stationary by wedging of rollers 41 against bar 34, the take-up spring 31 will not be able to move cup 30 leftward with the body 25, 23, 22 and rollers 46 carried thereby. With rollers 46 unwedged and rollers 39 and 41 wedged against the bar 34, the adjuster will now be in its normal or rest position.

In summary, during the first stage of braking, the adjuster will be rigid and move the brake shoes a preselected distance (corresponding to a 1.5 millimeter displacement of body 25, 23, 22 relative to the casing 2), and at the completion of this stage rollers 39 and 41 will be wedged against the bar 34 and rollers 46 will lightly contact the cup 30. During the second stage, the body 25, 23, 22 will be shifted an additional 1.5 millimeters relative to the casing 2, such that at the completion of this stage, the retaining rollers 41 and take-up rollers 46 will be so positioned as to permit elongation of the adjuster to any desired extent, if necessary, depending upon the extent to which the brake shoes prematurely contact the wheels, for thereby increasing the distance the brake shoes will have to travel to engage the wheels during the next brake application. During the third stage, the body 25, 23, 22 will continue to be moved rightward relative to the casing 2 an additional 1.5 millimeters, such that at the completion of this stage, the stop rollers 39 will be unwedged and the retaining rollers 41 will be wedged against the bar 34; and if the brake shoes have not engaged the wheels by the time the body 25, 23, 22 has thus been displaced rightward a total of 4.5 millimeters (1.5 millimeters during each stage), the body will continue to move rightward to the extent necessary to cause the brake shoes to engage the wheels and thus correspondingly pull the take-up rollers 46 and pull the body cage 22 away from sleeve 20.

During a brake releasing operation, leftward movement of the rod 34 relative to the casing under the action of the take-up rollers 46 will cause the adjuster to be shortened by a distance corresponding to the extent the body 25, 23, 22 had previously been moved rightward following the second stage of braking. This last-mentioned distance will be equal to 1.5 millimeters if slack was such that the brake shoes had engaged the wheel at substantially the same time as the body had been displaced rightward exactly 4.5 millimeters during the preceding brake application; whereas, if slack was excessive, this distance will be 1.5 millimeters plus whatever distance the cage 22 was pulled away from the sleeve 20 during the preceding brake application.

It will thus be apparent that the screw 48 is so adjusted as to provide a selectable clearance between the screw 48 and roller 26, in the rest position of the adjuster, which will correspond to the degree of slack desired, because the adjuster will upon completion of the second stage, elongate to increase slack if the brake shoes engage the wheels before the screw 48 engages the roller 26.

Assume now that it is desired to elongate the adjuster to increase slack in the brake rigging, such as to change brake shoes, or it is desired to cage the return spring 32 in order to facilitate removal and/or replacement of components. To accomplish this, a handle 28 which is rigidly secured to the link 27a is moved counterclockwise for forcing the roller 29 down behind the end wall 16 of the casing. Under this condition, the spring 32 will be caged to facilitate disassembly of the adjuster, and the respective components will be in the same positions they assumed at the completion of the second stage of braking. Hence, rollers 41 and 46 will be so positioned as to permit the bar 34, coupling sleeve 33 and traction bar 10 to be pulled manually rightward and out of the casing 2 for thereby increasing the slack clearance to facilitate changing the brake shoes associated with traction bar 10. To replace the brake shoes associated with traction bar 10a, the latter is pried leftward to cause lever 6 to pivot counter-clockwise relative to fixed member 8 and thereby, through link 9, cause lever 3 to rock counter-clockwise relative to the stationary piston rod 4 for shifting the trunnions 14 leftward, in the usual manner.

When the brake shoes have been replaced, the handle 28 is moved clockwise for raising the roller 29 to its normal position, in which it is shown in Fig. 3A. During the next brake application, the adjuster will operate to let out slack if it is insufficient or will be conditioned to take up slack during the succeeding brake release if slack is excessive, in the manner above described.

It is to be noted that, when the adjuster is in its rest position, the indicator sleeve 36, which is solidly connected to the bar 34 and traction bar 10 through the medium of sleeve 33, will extend beyond the tubular portion 25a a distance corresponding to the degree to which the adjuster is extended from its minimum length rest position, in which it is shown in Figs. 3–3A.

It will also be noted that the distance between the point of attachment of the trunnions 14 to the lever 3 (Fig. 5) and the point of connection of the rod 34 to the traction bar 10 by the coupling sleeve 33 is considerably shorter than with apparatus heretofore proposed. For example, in the present arrangement, this distance is about 1 centimeter; whereas, in the previous arrangement disclosed in the aforementioned patent, this distance corresponds substantially to the distance between the letters A and B (Figs. 3–3A). Hence, according to a feature of the invention, the improved adjuster is considerably more compact and can be more readily installed than the adjuster disclosed in said patent.

It will also be recalled that, according to another feature of the invention, the take-up spring 31 will act through the take-up cup 30 and push element 51 to maintain pressure on the retaining cups 19 for thus causing the rollers 41 to be maintained wedged against the rod 34, to prevent undesired elongation of the adjuster by a shock force of the type heretofore described and occurring while the adjuster is in its rest position.

It should also be noted that flange 52 is preferably provided on push element 51 to prevent said element from being pushed rightwardly past shoulder 13a. However, this flange 52 may be eliminated, if desired, and thus permit the rightmost retaining cup 19 to directly abut the shoulder 13a at the completion of the second stage and during the third stage instead of operatively abut said shoulder through the medium of said flange. It is possible to eliminate this flange 52 without undesirable effects because during the third stage of braking no thrust is exerted on the push element 51 by the take-up spring 31 and hence there is no objection to permitting the push element to freely slide in the clearance space between the rightmost retaining cup 19 and the then retracted (pushed rightward) take-up cup 30.

What I claim is:

1. An adjuster capable of lengthening and shortening the distance between the spaced points at which a lever and a traction bar are connected thereto; said adjuster comprising a prismatic rod rigidly connected at one end to the traction bar; tubular body means arranged concentrically with and overlying said one end of said prismatic rod; hollow casing means surrounding said prismatic rod and body means, and operably connected to the lever, and having two spaced annular shoulders; centrally apertured stop cup means; centrally apertured retaining cup means; a spacer spring interposed between said stop cup means and retaining cup means for biasing said retaining cup means in one direction toward operative engagement with one of said shoulders and biasing said stop cup means in the opposite direction into operative engagement with the other of said shoulders; the respective central apertures of said stop cup means and of said retaining cup means being defined in part by flat inclined wedging surfaces which are so inclined that the respective apertures of said stop cup means and of said retaining cup means are largest at their respective ends nearest the spacer spring; stop rollers wedgeable between the inclined wedging surfaces of said stop cup means and corresponding flat non-inclined faces of said prismatic rod; retaining rollers wedgeable between the inclined wedging surfaces of said retaining cup means and corresponding flat non-inclined faces of said prismatic rod; roller cage means carrying said stop rollers and retaining rollers; a sleeve engageable at one end with said body means and engageable at its opposite end with said retaining cup means; a stop spring stronger than said spacer spring interposed between said sleeve and said roller cage means for normally biasing the latter in said opposite direction for wedging said stop rollers and tending to unwedge said retaining rollers; centrally apertured take-up cup means having flat inclined wedging surfaces inclined in the same general direction as those of said retaining cup means; take-up rollers carried by said body means and wedgeable between the inclined wedging surfaces of said take-up cup means and corresponding flat non-inclined faces of said prismatic rod; a take-up spring interposed between said body means and said take-up cup means for urging the latter in said opposite direction for tending to wedge the take-up rollers; a push element interposed between and engageable with said retaining cup means and said take-up cup means for normally pushing said take-up cup means in said one direction against resistance of said take-up spring so as to normally unwedge the take-up rollers; and a return spring interposed between said casing means and said body means for normally urging said body means in said opposite direction for operatively, through the medium of said sleeve, exerting a force on said retaining cup means for causing it to wedge the retaining rollers against the prismatic rod against resistance of said spacer spring and space said retaining cup means from said one shoulder while said spacer spring maintains the stop cup means operatively engaged with said other shoulder, said stop spring at this time being effective to bias said roller cage means in said opposite direction to wedge the stop rollers and hold the retaining rollers against further movement in said opposite direction; said take-up spring being of greater force than the force of the stop spring and spacer spring, and effective, in event of a shock tending to compress the return spring and thereby relieve the retaining-roller-wedging force exerted via the body means and sleeve on the retaining cup means, to positively prevent any movement of the prismatic rod in said one direction relative to the casing means by exerting a retaining-roller-wedging force on said retaining cup means through the medium of said take-up cup means and push element, which latter force is exerted in bypass of said body means.

2. An adjuster capable of lengthening and shortening the distance between the spaced points at which a lever and a traction bar are connected thereto; said adjuster comprising a prismatic rod rigidly connected at one end to the traction bar; a generally tubular body means arranged concentrically with and overlying said one end of said prismatic rod; hollow casing means surrounding said prismatic rod and body means, and operably connected to the lever, and having two spaced annular shoulders; centrally apertured stop cup means; centrally apertured retaining cup means; a spacer spring interposed between said stop cup means and retaining cup means for biasing said retaining cup means in one direction toward operative engagement with one of said shoulders and biasing said stop cup means in the opposite direction toward operative engagement with the other of said shoulders; the respective central apertures of said stop cup means and of said retaining cup means being defined in part by flat inclined wedging surfaces which are so inclined that the respective apertures of said stop cup means and of said retaining cup means are largest at their respective ends nearest the spacer spring; stop rollers wedgeable between the inclined wedging surfaces of said stop cup means and corresponding flat non-inclined faces of said prismatic rod; retaining rollers wedgeable between the inclined wedging surfaces of said retaining cup means and corresponding flat non-inclined faces of said prismatic rod, roller cage means carrying said stop rollers and retaining rollers; a sleeve engageable at one end with said body means and engageable at its opposite end with said retaining cup means; another spring interposed between said casing means and said roller cage means for biasing the latter in said one direction for tending to unwedge the stop rollers and to wedge the retaining rollers; a stop spring stronger than said other spring and spacer spring interposed between said sleeve and said roller cage means for normally biasing the latter in said opposite direction against resistance of said other spring for wedging said stop rollers and tending to unwedge said retaining rollers; centrally apertured take-up cup means having flat inclined wedging surfaces inclined in the same general direction as those of said retaining cup means; take-up rollers carried by said body means and wedgeable between the inclined wedging surfaces of said take-up cup means and corresponding flat non-inclined faces of said prismatic rod; a take-up spring interposed between said body means and said take-up cup means for urging the latter in said opposite direction for tending to wedge the take-up rollers; a push element interposed between and engageable with said retaining cup means and said take-up cup means for normally pushing said take-up cup means in said one direction against resistance of said take-up spring so as to normally unwedge the take-up rollers; and a return spring interposed between said casing means and said body means for normally urging said body means in said opposite direction for operatively, through the medium of said sleeve, exerting a force on said retaining cup means for causing it to wedge the retaining rollers against the prismatic rod against resistance of said spacer spring and space said retaining cup means from said one shoulder while said spacer spring maintains the stop cup means operatively engaged with said other shoulder, said stop spring at this time being effective to bias said roller cage means in said opposite direction to wedge the stop rollers and held the retaining rollers against further movement in said opposite direction; said take-up spring being of greater force than the net force of the stop spring and other spring and spacer spring, and being effective, in event of a shock tending to compress the return spring and thereby relieve the retaining-roller-wedging force exerted via the body means and sleeve on the retaining cup means, to positively prevent any movement of the prismatic rod in said one direction relative to the casing means by exerting a force on said retaining cup means through the medium of said take-up cup means and push element, which latter force is exerted in bypass of said body means.

3. An adjuster capable of lengthening and shortening the distance between the spaced points at which a lever and a traction bar are connected thereto; said adjuster comprising a prismatic rod rigidly connected at one end to the traction bar; a generally tubular body means arranged concentrically with and overlying said one end of said prismatic rod; hollow casing means surrounding said prismatic rod and body means, and operably connected to the lever, and having two spaced annular shoulders; centrally apertured stop cup means; centrally apertured retaining cup means; a spacer spring interposed between said stop cup means and retaining cup means for biasing said retaining cup means in one direction toward operative engagement with one of said shoulders and biasing said stop cup means in the opposite direction into operative engagement with the other of said shoulders; the respective central apertures of said stop cup means and of said retaining cup means being defined in part by flat inclined wedging surfaces which are so inclined that the respective apertures of said stop cup means and of said retaining cup means are largest at their respective ends nearest the spacer spring; stop rollers wedgeable between the inclined wedging surfaces of said stop cup means and corresponding flat non-inclined faces of said prismatic rod; retaining rollers wedgeable between the inclined wedging surfaces of said retaining cup means and corresponding flat non-inclined faces of said prismatic rod; roller cage means carrying said stop rollers and retaining rollers; a sleeve engageable at one end with said body means and engageable at its opposite end with said retaining cup means; another spring interposed between said casing means and said roller cage means for biasing the latter in said one direction for tending to unwedge the stop rollers and to wedge the retaining rollers; a stop spring stronger than said other spring and spacer spring interposed between said sleeve and said roller cage means for normally biasing the latter in said opposite direction against resistance of said other spring for wedging said stop rollers and tending to unwedge said retaining rollers; centrally apertured take-up cup means having flat inclined wedging surfaces inclined in the same general direction as those of said retaining cup means; take-up rollers carried by said body means and wedgeable between the inclined wedging surfaces of said take-up cup means and corresponding flat non-inclined faces of said prismatic rod; a take-up spring interposed between said body means and said take-up cup means for urging the latter in said opposite direction for tending to wedge the take-up rollers; a push element interposed between and engageable with said retaining cup means and said take-up cup means for normally pushing said take-up cup means in said one direction against resistance of said take-up spring so as to normally unwedge the take-up rollers; and a return spring interposed between said casing means and said body means for normally urging said body means in said opposite direction for operatively, through the medium of said sleeve, exerting a force on said retaining cup means for causing it to wedge the retaining rollers against the prismatic rod against resistance of said spacer spring and space said retaining cup means from said one shoulder, while said spacer spring maintains the stop cup means operatively engaged with said other shoulder; said stop spring at this time being effective to bias said roller cage means in said opposite direction to wedge the stop rollers and hold the retaining rollers against further movement in said opposite direction.

4. An adjuster according to claim 3, wherein said prismatic rod is arranged coaxially with the traction bar, and wherein the point of connection of said prismatic rod with the traction bar is a small distance, of the order of about one centimeter, offset from the point of attachment of said casing means with the lever when the adjuster is of minimum length.

5. An adjuster according to claim 3, including an indicator sleeve operatively secured to said prismatic rod and of such length that when the adjuster is of minimum length, said indicator sleeve will be flush with the end of said body means, and as said adjuster is lengthened by movement of said prismatic rod in said one direction outwardly relatively to said casing means, said indicator sleeve will denote the extent by which the adjuster has been extended from its minimum length.

6. An adjuster as claimed in claim 3, including link means pivotally connected to a portion of said body means that extends exteriorly of said casing means, and manually operable means for pulling said link means into engagement with said casing means for caging the return spring and shifting said body means in said one direction relative to said casing means to a position in which said body means through the medium of said take-up rollers holds said take-up cup means against resistance of the take-up spring for relieving the thrust normally exerted by the take-up spring on the retaining cup means through the medium of the take-up cup means and push element, for thereby permitting said spacer spring to shift said retaining cup means in said one direction into operative engagement with said one shoulder, and thus move relative to the roller cage means which is still biased in said opposite direction by said stop spring, with the result that the prismatic rod may be freely pulled manually in said one direction relative to and outwardly of the casing means and body means but reverse movement of said prismatic rod is prevented by wedging of the stop rollers under action of the spacer spring, which maintains the stop cup means in operative engagement with said other shoulder.

7. An adjuster as claimed in claim 3, including a washer interposed between said stop spring and roller cage means; and a retaining ring carried by said sleeve, and normally out of contact with said washer, and slidable along and relative to said roller cage means into contact with said washer; and wherein said body means is movable, during a brake application, in said one direction relative to said casing means; the various aforementioned components being so dimensioned that during the initial stage of such movement of said body means through a preselected relatively small distance, said body means will cause said take-up rollers to be carried into initial contact with said take-up cup means, while said stop rollers and retaining rollers remain wedged against the prismatic rod; whereupon during a later stage of such movement of the body means through a preselected additional distance, said body means will pull said take-up cup means said additional distance in said one direction through the medium of the wedged take-up rollers to relieve the retaining-roller wedging force operatively exerted by said take-up spring for thereby permitting the spacer spring to shift said retaining cup means into operative contact with said one shoulder and concurrently causing said stop spring to correspondingly push said sleeve in said one direction for maintaining contact with said body means and thereby causing the retaining ring to lightly engage the washer without caging the stop spring so that the latter will continue to bias the roller cage means in said opposite direction for wedging the stop rollers, with the result that the prismatic rod may be pulled, if necessary, in said one direction relative to said casing means; whereupon during a still later stage of such movement of the body means, the take-up cup means through the medium of said take-up rollers will be pulled by said body means out of contact with said push element, and said stop spring will be caged, by movement of said sleeve under action of the stop spring in said one direction tending to maintain contact with said body means, and thus permit said other spring to shift said roller cage means in said one direction for wedging said retaining rollers against the prismatic rod and unwedging the stop rollers while the retaining cup means and stop cup means are held stationary, with the result that during subsequent movement of said body means in said opposite direction by said return spring upon a release of the brake application, the take-up spring will wedge the take-up rollers against the prismatic rod and force the latter in said opposite direction a distance equal to the distance that the take-up cup means was pulled out of contact with said push element.

8. An adjuster as claimed in claim 3, including a washer interposed between said stop spring and roller cage means; and a retaining ring carried by said sleeve, and normally out of contact with said washer, and slidable along and relative to said roller cage means into contact with said washer; and wherein said body means is movable, during a brake application, in said one direction relative to said casing means; the various aforementioned components being so dimensioned that during the initial stage of such movement of said body means through a preselected relatively small distance, said body means will cause said take-up rollers to be carried into initial contact with said take-up cup means, while said stop rollers and retaining rollers remain wedged against the prismatic rod; whereupon during a later stage of such movement of the body means through a preselected additional distance, said body means will pull said take-up cup means said additional distance in said one direction through the medium of the take-up rollers to relieve the retaining-roller wedging force operatively exerted by said take-up spring for thereby permitting the spacer spring to shift said retaining cup means into operative contact with said one shoulder and concurrently causing said stop spring to correspondingly push said sleeve in said one direction for maintaining contact with said body means and thereby causing the retaining ring to lightly engage the washer without caging the stop spring so that the latter will continue to bias the roller cage means in said opposite direction for wedging the stop rollers, with the result that the prismatic rod may be pulled, if necessary, in said one direction relative to said casing means; whereupon during a still later stage of such movement of the body means the take-up cup means through the medium of said take-up rollers will be pulled by said body means out of contact with said push element, and said stop spring will be caged, by movement of said sleeve under action of the stop spring in said one direction tending to maintain contact with said body means, and thus permit said other spring to shift said roller cage means in said one direction for wedging said retaining rollers against the prismatic rod and unwedging the stop rollers while the retaining cup means and stop cup means are held stationary, so as to condition the adjuster to permit movement of said prismatic rod in said opposite direction relative to said casing means.

9. An adjuster as claimed in claim 8, including control rod means; a cam member connected to said control rod means; link means pivotally connected to a portion of said body means that extends exteriorly of said casing means; a roller carried by said link means and engageable with said cam member; said control rod means being movable in said one direction during a brake application for causing the moving cam member to deflect the last-named roller into engagement with the casing means for operatively moving said body means successively through said preselected relatively small distance and then said preselected additional distance for effecting the aforementioned initial stage and later stage of movement of said body means; and said control rod means thereafter being movable further in said one direction and operative, by abutting contact with said exterior portion of said body means in bypass of said link means, to further shift said body means in said one direction for effecting the aforementioned still later stage of movement of the body means.

References Cited in the file of this patent

FOREIGN PATENTS

| | | |
|---|---|---|
| 383,549 | Great Britain | 1932 |
| 520,922 | Great Britain | 1940 |
| 671,663 | Great Britain | 1952 |
| 922,930 | France | 1947 |